US010048816B2

(12) United States Patent
Park et al.

(10) Patent No.: US 10,048,816 B2
(45) Date of Patent: Aug. 14, 2018

(54) TOUCH WINDOW

(71) Applicant: LG INNOTEK CO., LTD., Seoul (KR)

(72) Inventors: Soung Kyu Park, Seoul (KR); Gyun Rin Lee, Seoul (KR); Do Youb Kwon, Seoul (KR); Seok Pyo Yun, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 304 days.

(21) Appl. No.: 14/994,805

(22) Filed: Jan. 13, 2016

(65) Prior Publication Data

US 2016/0202804 A1 Jul. 14, 2016

(30) Foreign Application Priority Data

Jan. 13, 2015 (KR) .................. 10-2015-0006043

(51) Int. Cl.
*G06F 3/044* (2006.01)
(52) U.S. Cl.
CPC .... *G06F 3/044* (2013.01); *G06F 2203/04103* (2013.01); *G06F 2203/04107* (2013.01); *G06F 2203/04112* (2013.01)
(58) Field of Classification Search
CPC . G06F 2203/04103; G06F 2203/04107; G06F 2203/04112; G06F 3/044
See application file for complete search history.

(56) References Cited

U.S. PATENT DOCUMENTS

| | | | | |
|---|---|---|---|---|
| 9,746,880 B2* | 8/2017 | Kim | ................... | G06F 1/1626 |
| 9,772,727 B2* | 9/2017 | Kim | ................... | G06F 3/044 |
| 9,817,435 B2* | 11/2017 | Qian | ................... | G06F 1/16 |
| 9,817,497 B2* | 11/2017 | Kim | ................... | G06F 3/041 |
| 9,891,769 B2* | 2/2018 | Han | ................... | G06F 3/044 |
| 2014/0176464 A1* | 6/2014 | Kim | ................... | G06F 3/0418 345/173 |
| 2015/0109246 A1* | 4/2015 | Lee | ................... | G06F 3/045 345/174 |
| 2015/0130760 A1* | 5/2015 | Kim | ................... | G06F 3/044 345/174 |
| 2015/0130763 A1* | 5/2015 | Park | ................... | G06F 3/041 345/174 |
| 2015/0199049 A1* | 7/2015 | Yang | ................... | G06F 3/044 345/174 |
| 2015/0227239 A1* | 8/2015 | Kim | ................... | G06F 3/044 345/174 |

(Continued)

FOREIGN PATENT DOCUMENTS

KR 10-2014-0048365 A 4/2014
KR 10-2014-0095863 A 8/2014

*Primary Examiner* — Dmitriy Bolotin
(74) *Attorney, Agent, or Firm* — KED & Associates, LLP

(57) ABSTRACT

A touch window is provided. The touch window may include a substrate including an active area and an unactive area, a first sensing electrode on the active area, a wire electrode on the unactive area, an intermediate layer on the substrate, a second sensing electrode on the intermediate layer, and a conductive layer on the wire electrode. The conductive layer may include a material that corresponds to a material constituting at least one of the first sensing electrode and the second sensing electrode.

5 Claims, 10 Drawing Sheets

(56) References Cited

U.S. PATENT DOCUMENTS

| | | | | |
|---|---|---|---|---|
| 2015/0277643 | A1* | 10/2015 | Kim | G06F 1/1626 345/173 |
| 2015/0309606 | A1* | 10/2015 | Qian | G06F 3/044 345/173 |
| 2015/0382446 | A1* | 12/2015 | Kwon | H05K 1/028 174/251 |
| 2016/0081184 | A1* | 3/2016 | Katagiri | H01L 51/0021 174/268 |

* cited by examiner

TOUCH WINDOW

CROSS-REFERENCE TO RELATED APPLICATION

This application claims priority under 35 U.S.C. § 119 to Korean Application No. 10-2015-0006043 filed on Jan. 13, 2015, whose entire disclosure is incorporated herein by reference.

BACKGROUND

1. Field

Embodiments relate to a touch window.

2. Background

A touch window, which performs an input function through a touch of an image displayed on a display by an input device such as a stylus pen or a finger, has been applied to various electronic appliances.

For example, the touch window may include a sensing electrode on a substrate and a wire electrode connected with the sensing electrode to detect a position of a touch by detecting a variation in capacitance when an area, in which the sensing electrode may be provided, is touched. A touch signal detected from the sensing electrode is transmitted to a chip mounted on a printed circuit board through the wire electrode, so that an operation based on the touch signal may be performed.

Noise may be generated from the wire electrode formed of a conductive material, and when the sensing electrode is touched, a touch error may occur and touch efficiency may be degraded due to the noise generated from the wire electrode. Accordingly, a touch window that solves the above problems is required.

BRIEF DESCRIPTION OF THE DRAWINGS

The embodiments will be described in detail with reference to the following drawings in which like reference numerals refer to like elements wherein.

DETAILED DESCRIPTION

Figure 1:
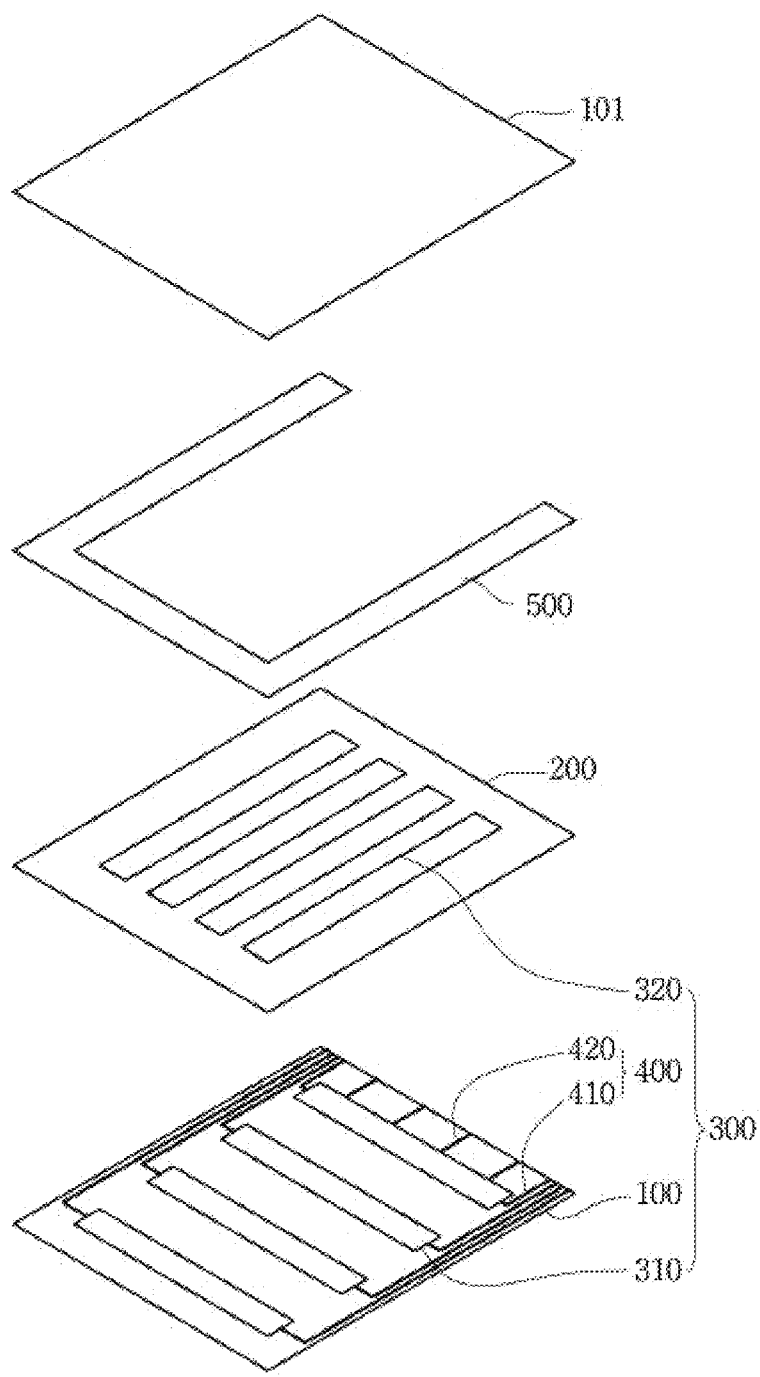
FIG. 1 is a perspective view showing a touch window according to an embodiment.
Figure 2:
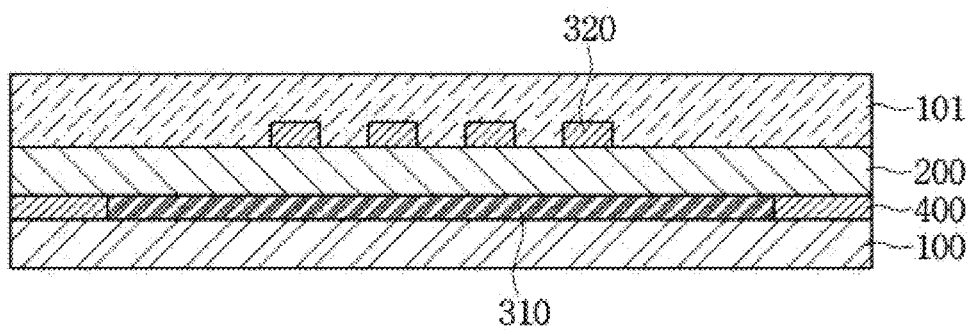
FIG. 2 is a sectional view taken along line A-A' of FIG. 1.

Referring to FIG. 1, a touch window according to the embodiment may include a substrate 100, an intermediate layer 200, a sensing electrode 300, and a wire electrode 400. The substrate 100 may be rigid or flexible. For example, the substrate 100 may include glass or plastic. The substrate 100 may include chemically tempered/semi-tempered glass, such as, e.g., soda lime glass or aluminosilicate glass, reinforced/flexible plastic, such as, e.g., polyimide (PI), polyethylene terephthalate (PET), propylene glycol (PPG), or poly carbonate (PC), or sapphire.

The substrate 100 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

Sapphire has superior electric characteristics, for example, permittivity, such that touch response speed may be greatly increased and a space touch, such as, e.g., hovering, may be easily implemented. Hovering may refer to a technique of recognizing coordinates even at a slight distance from a display. In addition, since sapphire has high surface hardness, sapphire may be applicable to a cover substrate.

The substrate 100 may be bent with a partial curved surface. That is, the substrate 100 may be bent with a partial flat surface and a partial curved surface. An end of the substrate 100 may be bent with a curved surface or may be bent or flexed with a surface including a random curvature.

The substrate 100 may include a flexible substrate having a flexible property. Further, the substrate 100 may include a curved or bended substrate. That is, a touch window including the substrate 100 may be formed to have a flexible, curved or bended property. Thus, the touch window according to the embodiment may be easily portable and may be variously changed in design.

A decoration layer having a predetermined color may be provided on the substrate 100. For example, in order to match with a color of a peripheral part of a finger sensor or a color of a package provided at an area of the cover substrate, the decoration layer may be additionally provided for color implementation.

The sensing electrode and the wire electrode may be provided on the substrate. That is, the substrate may be a support substrate.

The substrate 100 may include a cover substrate. That is, the sensing electrode and the wire electrode may be supported by the cover substrate. An additional cover substrate may be provided on the substrate. The sensing electrode and the wire electrode may be supported by the substrate, and the substrate and the cover substrate may be combined with each other through an adhesive layer. Accordingly, the cover substrate may be formed separately from the substrate, and the touch window may be mass-produced.

The substrate 100 may have an active area AA and an unactive area UA defined therein. An image may be displayed in the active area AA. The image may not be displayed in the unactive area UA provided at a peripheral portion of the active area AA.

A position of an input device, such as, e.g., a stylus pen, or a finger may be sensed in at least one of the active area AA and the unactive area UA. If the input device or a finger touches the touch window, a variation in capacitance occurs in a touched part or portion by the input device, and the touched part, which may be subject to the variation in the capacitance, may be detected as a touch point.

The sensing electrode 300 may include a first sensing electrode 310 and a second sensing electrode 320. The first sensing electrode 310 and the second sensing electrode 320 may extend in mutually different directions, and may be provided at mutually different positions.

The first sensing electrode 310 may be provided on the substrate 100. For example, the first sensing electrode 310 may be provided in at least one of the active area AA and the unactive area UA. The first sensing electrode 310 may be provided on the active area AA of the substrate 100.

The second sensing electrode 320 may be provided on the intermediate layer 200. For example, the second sensing electrode 320 may be provided on the intermediate layer 200 corresponding to the active area AA and the unactive area UA. The second sensing electrode 320 may be provided on the intermediate layer 200 corresponding to the active area AA.

The first sensing electrode 310 and the second sensing electrode 320 may extend in mutually different directions. That is, the first sensing electrode 310 may extend in a first direction, and the second sensing electrode 320 may extend in a direction different from the first direction.

At least one of the first sensing electrode 310 and the second sensing electrode 320 may include a transparent conductive material that allows electricity to flow therethrough without interrupting transmission of light. For example, the sensing electrode 300 may include metal oxide such as indium tin oxide (ITO), indium zinc oxide (IZO), copper oxide, tin oxide, zinc oxide, or titanium oxide. Accordingly, since the transparent material is provided on a sensing active area, a degree of freedom may be improved when the pattern of the sensing electrode is formed.

At least one of the first sensing electrode 310 and the second sensing electrode 320 may include a nanowire, a photo sensitive nanowire film, a carbon nanotube (CNT), graphene, conductive polymer or a mixture thereof. Thus, when a flexible or bendable touch window is manufactured, the degree of freedom may be improved.

When a nano-composite, such as, e.g., a nanowire or a carbon nanotube (CNT) is used, the sensing electrode may be configured in a black color and color and reflectance may be controlled while ensuring electric conductivity by adjusting the content of nano-powders.

At least one of the first sensing electrode 310 and the second sensing electrode 320 may include various metals. For example, the sensing electrode 200 may include at least one of Cr, Ni, Cu, Al, Ag, Mo, Au, Ti and the alloy thereof. Thus, when a flexible or bendable touch window is fabricated, the degree of freedom may be improved.

At least one of the first sensing electrode 310 and the second sensing electrode 320 may be formed in a mesh shape. In this case, a line width of a mesh line of the sensing electrode 300 may be in the range of about 0.1 μm to about 10 μm. The mesh line having the line width of less than about 0.1 μm may not be fabricated, or may be electrically shorted, and the mesh line having the line width of more than about 10 μm may allow an electrode pattern to be viewed to degrade the visibility. The line width of the mesh line may be in the range of about 0.5 μm to about 7 μm. For example, the line width of the mesh line may be in the range of about 1 μm to about 3.5 μm.

A mesh opening may be formed in various shapes. For example, the mesh opening OA may have various shapes, such as, e.g., a polygonal shape including a rectangular shape, a diamond shape, a pentagonal shape or a hexagonal shape, or a circular shape. In addition, the mesh opening may be formed in a regular or random shape.

A thickness of the mesh line may be in the range of about 100 nm to about 500 nm. The mesh line having the thickness of less than about 100 nm may increase electrode resistance so that electrical characteristics may be degraded. The mesh line having the thickness of more than about 500 nm may increase an overall thickness of the touch window and may degrade process efficiency. The thickness of the mesh line may be in the range of about 150 nm to about 200 nm. For example, the thickness of the mesh line may be in the range of about 180 nm to about 200 nm.

The sensing electrode may have a mesh shape so that a pattern of the sensing electrode may not be viewed or visible on the active area AA. That is, even if the sensing electrode is formed of metal, the sensing electrode may not be visible. In addition, even if the sensing electrode is applied to a large-size touch window, the resistance of the touch window may be lowered The wire electrode 400 may be provided on the substrate 100. The wire electrode 400 may be provided on at least one of the active area AA and the unactive area UA of the substrate 100. For example, the wire electrode 400 may be provided on the unactive area UA of the substrate 100. The wire electrode 400 may include a first wire electrode 410 and a second wire electrode 420. For example, the wire electrode 400 may include the first wire electrode 410 connected with the first sensing electrode 310, and the second wire electrode 420 connected with the second sensing electrode 320.

The first wire electrode 410 and the second wire electrode 410 may be provided on the unactive area UA of the substrate 100. An end of the first wire electrode 410 and an end of the second wire electrode 410 may be connected with the first sensing electrode 310 and the second sensing electrode 320, respectively, and an opposite end of the first wire electrode 410 and an opposite end of the second wire electrode 410 may be connected with a circuit board. The circuit board may include variously-shaped circuit boards. For example, the circuit board may include a flexible printed circuit board (FPCB).

The first wire electrode 410 and the second wire electrode 410 may include metal that has superior electrical conductivity. For example, the wire electrode 400 may include a material similar to that of the sensing electrode 300 and the same as that of the sensing electrode 300.

The first and second wire electrodes 410 and 420 may be provided to make contact with a surface of the substrate 100. For example, the first and second wire electrodes 410 and 420 may be provided to directly or indirectly make contact with one surface of the substrate 100. Accordingly, at least one of the first and second wire electrodes 410 and 420 may be provided with a step difference from the intermediate layer 200 provided on the substrate 100.

At least one of the sensing electrodes and the wire electrodes may be provided on the substrate 100. The first sensing electrode 310, which may be provided on the substrate 100, may be connected with the first wire electrode 410, which may be provided on the substrate 100, on the substrate 100.

At least one of the sensing electrodes and at least one of the wire electrodes may be connected with each other on the intermediate layer 200. For example, the second sensing electrode 320 provided on the intermediate layer 200 may be connected with the second wire electrode 410, which may be provided on the substrate 10, on the intermediate layer 200.

The intermediate layer 200 may be provided on the substrate 100. The intermediate layer 200 may be provided on the active area and the unactive area of the substrate 100. For example, the intermediate layer 200 may be provided on the first sensing electrode 310 and the wire electrode 400. The intermediate layer 200 may be provided on the substrate 100 to cover the first sensing electrode 310, the first wire electrode 410, and the second wire electrode 420.

The intermediate layer 200 may include a material different from than a material of the substrate 100. For example, the intermediate layer 200 may include a dielectric material. The intermediate layer 200 may include an insulating group including halogen compound of alkali metal or alkali earth metal, such as LiF, KCl, $CaF_2$, or $MgF_2$, or fused silica, such as $SiO_2$, SiNX, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as ZnOx, ZnS, ZnSe, TiOx, WOx, MoOx, or ReOx; an organic semiconductor group including $Alq_3$, NPB, TAPC, 2TNATA, CBP or Bphen; and a low-K material such as silsesquioxane or a derivative ((H—SiO3/2)n) thereof, methylsilsesquioxane ($CH3-SiO_{3/2}$)n), porous silica or porous silica doped with fluorine or carbon atoms, porous zinc oxide (ZnOx), cyclized-perfluoropolymer (CYTOP) or a mixture thereof.

The intermediate layer 200 may have visible ray transmittance of 79% to 99%. In this case, the thickness of the intermediate layer 200 may be less than the thickness of the substrate 100. The thickness of the intermediate layer 200 may be 0.01 times to 0.1 times the thickness of the substrate 100. For example, the thickness of the substrate 100 may be about 0.1 mm, and the thickness of the intermediate layer 200 may be about 0.001 mm, but the embodiment is not limited thereto. In addition, a sectional area of the intermediate layer 200 may be different from that of the substrate 100. The sectional area of the intermediate layer 200 may be smaller than that of the substrate 100.

The intermediate layer 200 may directly make contact with the top surface of the substrate 100. That is, the intermediate layer 200 may be formed by directly applying a dielectric material onto the top surface of the substrate 100 having the first sensing electrode 310, the first wire electrode 410, and the second wire electrode 420. Thereafter, the second sensing electrode 320 may be provided on the intermediate layer 200.

The intermediate layer 200 may support the second sensing electrode 320. The second sensing electrode 320 may be provided on at least one of both surfaces of the intermediate layer 200.

An exposure area OA may be formed in the intermediate layer 200. For example, the exposure area OA may be formed in the intermediate layer 200, and a surface of the substrate 100 may be exposed through the exposure area OA. The exposure area OA may expose the unactive area of the substrate 100.

An additional adhesive layer, such as, e.g., an optical clear adhesive (OCA) or optical clear resin (OCR), may not be provided between the intermediate layer 200 and the substrate 100. Accordingly, the thickness of the touch window may be reduced by the size of the adhesive layer.

Figure 3:
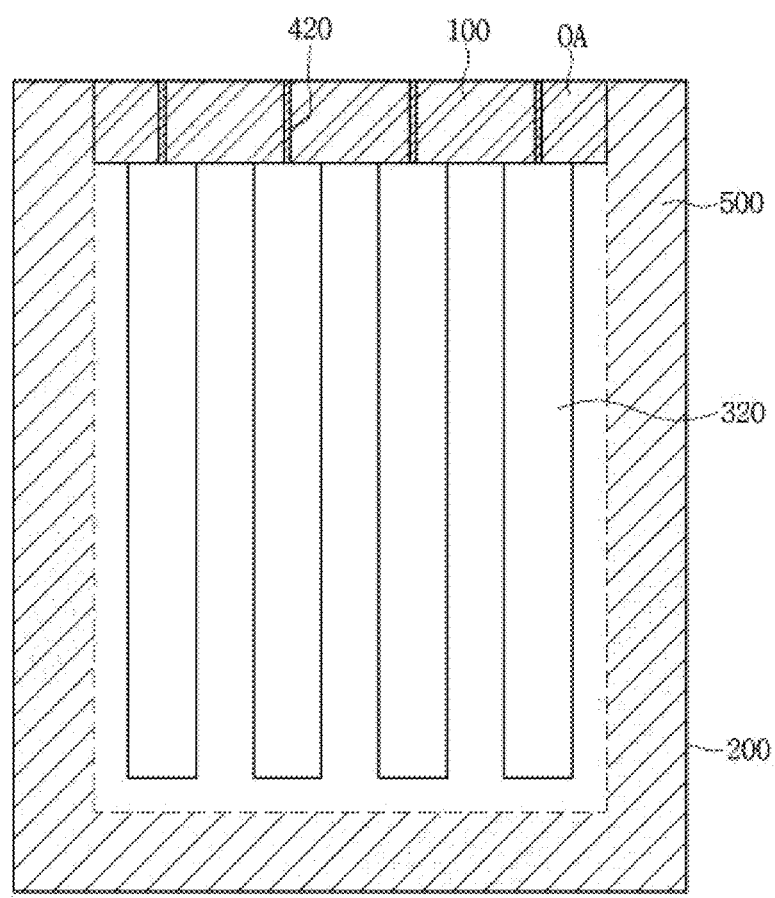
FIGS. 3 and 4 are sectional views illustrating an exposure area formed in an intermediate layer of the touch window according to the embodiment.
Figure 4:
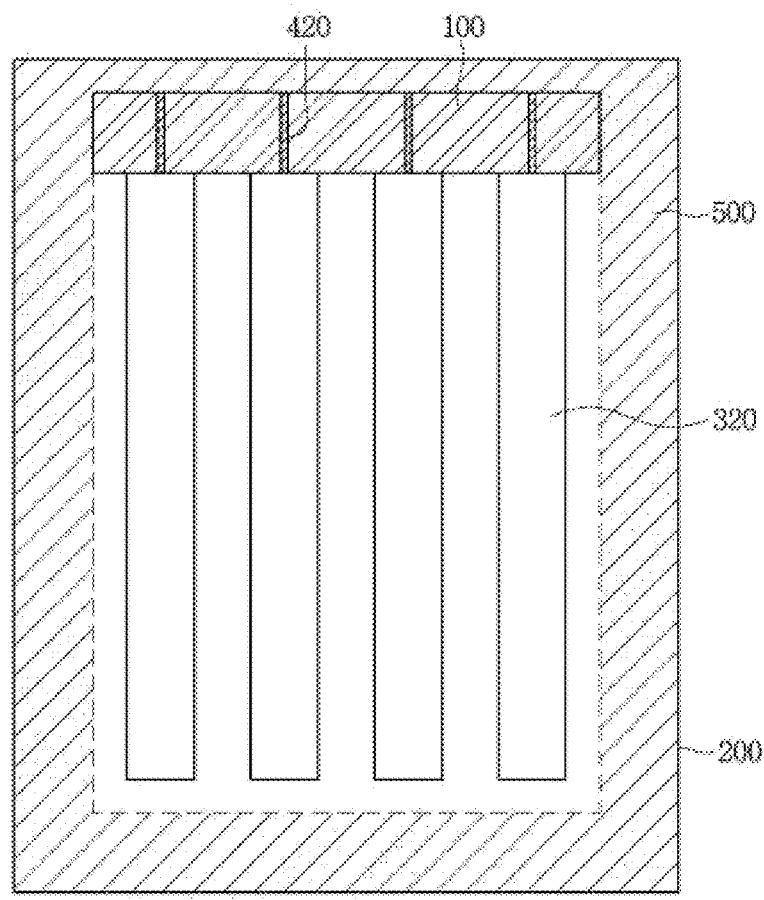

Referring to FIG. 3, the exposure area OA may be formed to open an end of the intermediate layer 200. Referring to FIG. 4, the exposure area OA in the intermediate layer 200 may correspond to a hole area formed through the intermediate layer 200.

At least one exposure area OA may be formed. The exposure area OA may include a plurality of exposure areas or may include one exposure area formed by integrating the plurality of exposure areas with each other.

The wire electrode 400 provided on the unactive area of the substrate 100 may be exposed through the exposure area OA. The second wire electrode 420 provided on the unactive area of the substrate 100 may be exposed through the exposure area OA.

The second sensing electrode 320 provided on the intermediate layer 200 may be connected with the second wire electrode 420 provided on the substrate 100. For example, the second sensing electrode 320 may be connected with the second wire electrode 420 through the exposure area OA formed on the intermediate layer 200.

Figure 5:
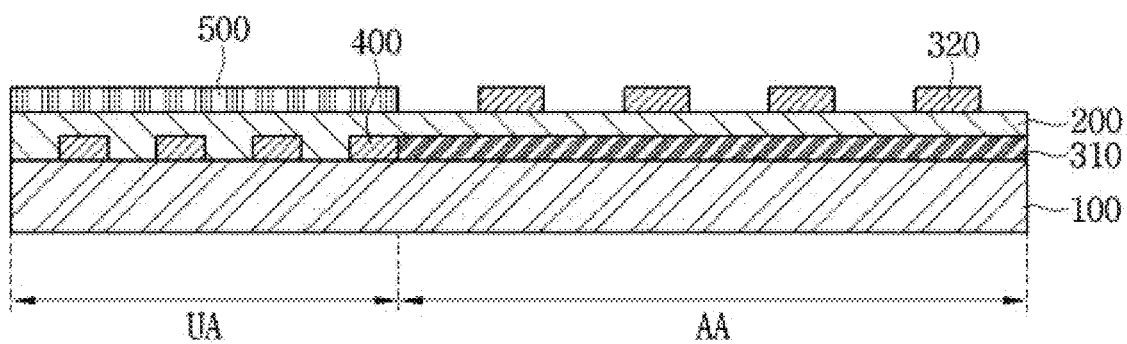
FIGS. 5 and 6 are sectional views illustrating an area in which a conductive layer of the touch window according to the embodiment is arranged.

A conductive layer 500 may be provided on the intermediate layer 200. For example, the conductive layer 500 may be provided on the intermediate layer 200 corresponding to the unactive area of the substrate 100. The conductive layer 500 may be spaced apart from the second sensing electrode 320. The conductive layer 500 may be provided on the entire surface of the intermediate layer 200 corresponding to the unactive area UA of the substrate 100 or may be provided on a partial surface of the intermediate layer 200. For example, the conductive layer 500 may be provided on an entire surface of the intermediate layer 200 corresponding to the unactive area UA of the substrate 100 as shown in FIG. 5.

Figure 6:
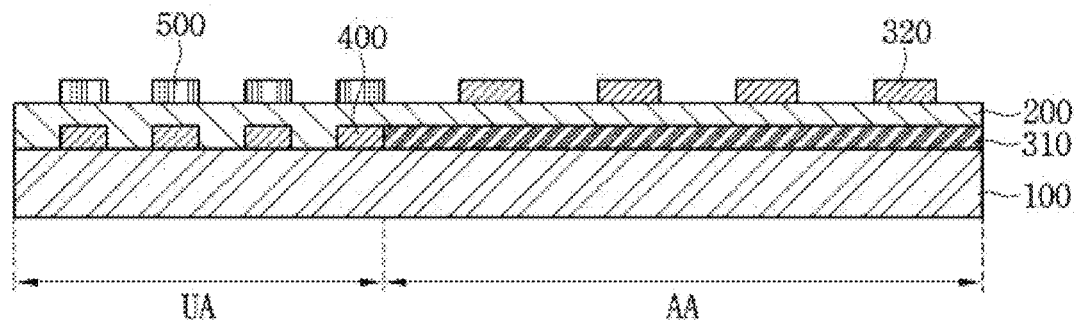

As shown in FIG. 6, the conductive layer 500 may be partially provided on a surface of the intermediate layer 200 corresponding to the unactive area UA of the substrate 100. For example, the conductive layer 500 may be provided on a surface of the intermediate layer 200 corresponding to the unactive area UA of the substrate 100 and provided at positions of the intermediate layer 200 corresponding to areas where the first and second wire electrodes 410 and 420 are provided.

The conductive layer 500 may include a conductive material. For example, the conductive layer 500 may include a material the same as that of at least one of the sensing electrode 300 and the wire electrode 400, or a material similar to that of at least one of the sensing electrode 300 and the wire electrode 400. For example, the conductive layer 500 may include a material corresponding to at least one of the first and second sensing electrodes 310 and 320.

The conductive layer 500 may be provided on the unactive area UA to block movement of noise generated from the wire electrode 400. That is, touch efficiency may be degraded and the touch error may be caused by noise generated from the wire electrode when the sensing electrode 300 is touched since the wire electrode 400 is formed of a conductive material. Accordingly, the conductive layer 500 serving as a shield layer may be provided on the wire electrode 400 to block the movement of the noise so that touch efficiency and reliability of the touch window may be improved.

The conductive layer 500 may be formed together with the sensing electrode 300. For example, the conductive layer 500 may be formed through the same process as that of the second sensing electrode 320 on the intermediate layer 200. The above conductive material may be provided on the intermediate layer 200, the second sensing electrode 320 may be formed on the active area AA by patterning the conductive material, and the conductive layer 500 may be formed on the unactive area UA by patterning the conductive material.

The sensing electrode 300 and the conductive layer 500 may be simultaneously formed through one process. Accordingly, the conductive layer 500, that is, the shield layer to block the noise generated from the wire electrode 400, may not be separately formed but formed together with the sensing electrode 300 when the sensing electrode 300 is formed. Accordingly, process efficiency may be improved. When the shield layer is formed, since an additional support member is not required to support the shield layer, an increase of the thickness resulting from the formation of the support member may be prevented.

FIGS. 7 to 13 show a touch window according to another embodiment. In the following description of the touch window, descriptions the same as or similar to that of the touch window according to the previous embodiment have been omitted. In addition, same reference numerals may be assigned to same elements as those of the previous embodiment.

Figure 7:
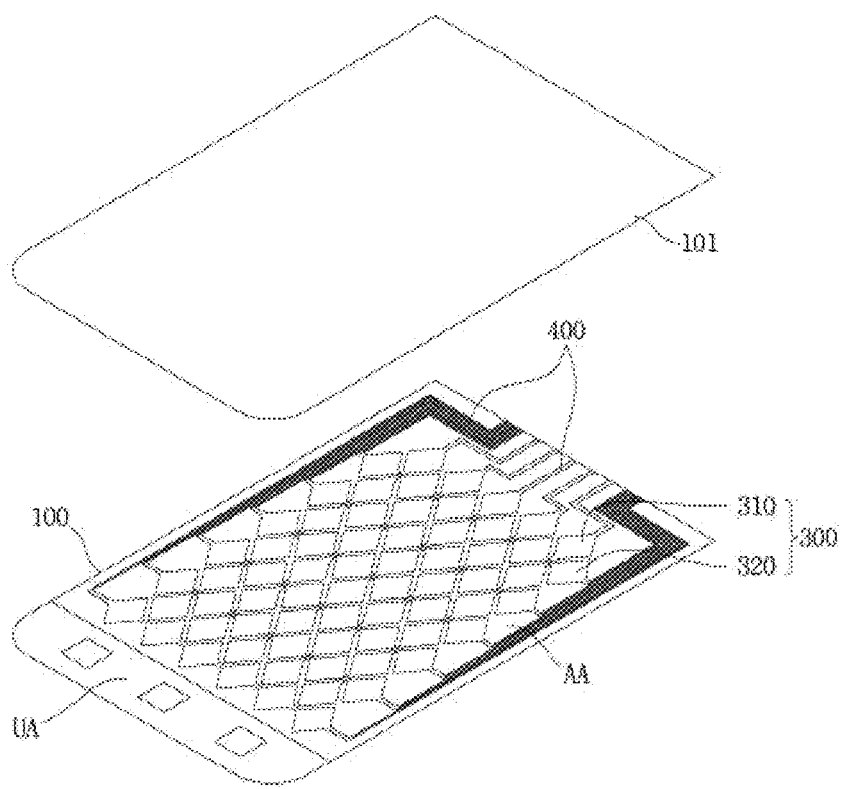
FIG. 7 is a perspective view showing a touch window according to another embodiment.
Figure 8:
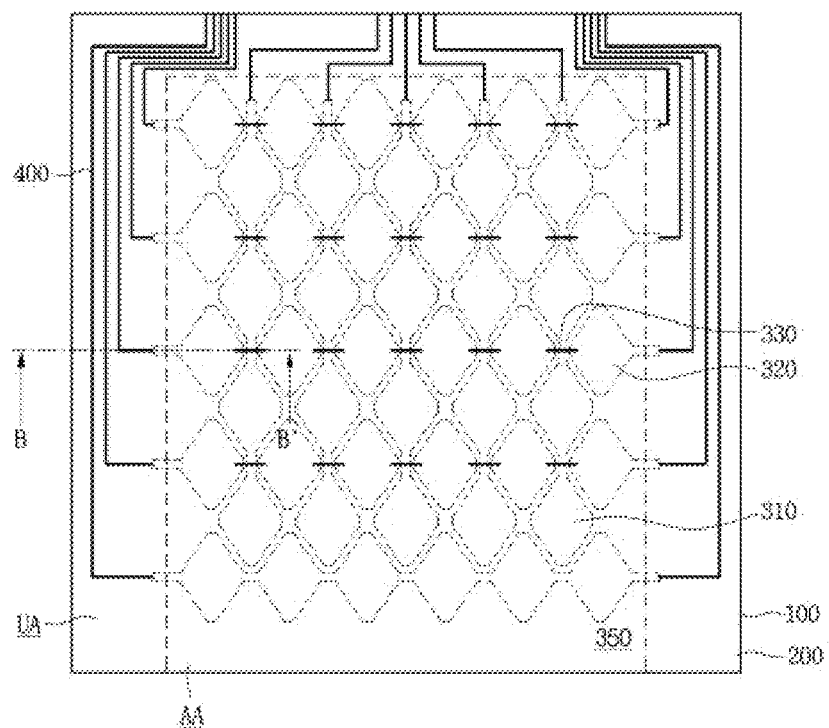
FIG. 8 is a plan view showing the touch window of FIG. 7.
Figure 9:
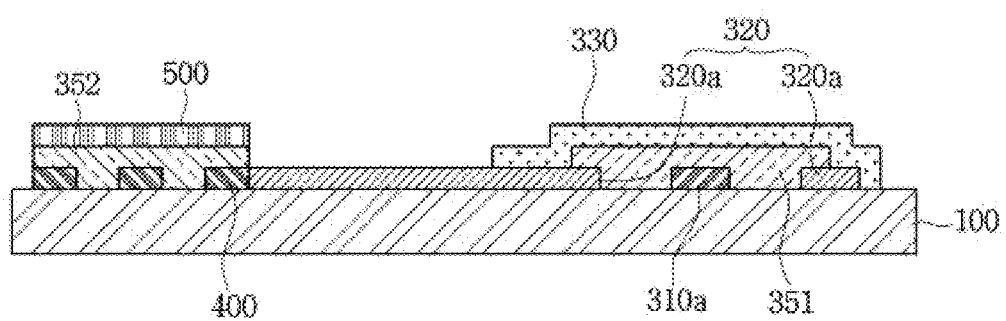
FIG. 9 is a sectional view taken along line B-B' of FIG. 8.

Referring to FIG. 7, the touch window according to the second embodiment may include a cover substrate 101, a substrate 100, a sensing electrode 300, a wire electrode 400, and a conductive layer 500. The cover substrate 101 may be provided on the substrate 100. The cover substrate 101 may be combined with the substrate 100. For example, the cover substrate 101 may be bonded to the substrate 100 by the OCA or the OCR.

The substrate 100 may be provided thereon with the sensing electrode 300 and the wire electrode 400. A first surface of the substrate 100 may be bonded to the cover substrate 101, and a second surface of the substrate 100 opposite to the first surface of the substrate 100 may be provided thereon with the sensing electrode 300 and the wire electrode 400.

The sensing electrode 300 may include a first sensing electrode 310 and a second sensing electrode 320. The first sensing electrode 310 and the second sensing electrode 320 may be provided on the substrate 100. The first sensing electrode 310 and the second sensing electrode 320 may be provided on the same surface of the substrate 100. For example, the first sensing electrode 310 and the second sensing electrode 320 may extend in mutually different directions, and may be provided on a same surface of the substrate 100. The first sensing electrode 310 may be provided to extend in a first direction on the active area AA of the substrate 100. The first sensing electrode 310 may directly or indirectly make contact with the substrate 100.

The second sensing electrode 320 may be provided to extend in a second direction different from the first direction on the active area AA of the substrate 100. The second sensing electrode 320 may extend in the second direction different from the first direction and may directly or indirectly make contact with the substrate 100. That is, the first and second sensing electrodes 310 and 320 may make contact with the same surface of the substrate 100 while extending in mutually different directions on the same surface of the substrate 100.

The first sensing electrode 310 and the second sensing electrode 320 may be insulated from each other on the substrate 100 by a connection electrode 330 and an insulating layer 350. For example, referring to FIGS. 8 and 9, the first sensing electrode 310 and the second sensing electrode 320 may be provided on the substrate 100, and the connection electrode 330 and a first insulating layer 351 may be provided on the first sensing electrode 310 and the second sensing electrode 320.

The first sensing electrode 310 and the second sensing electrode 320 may include a plurality of unit sensing electrodes. For example, the first sensing electrode 310 may include a plurality of first unit sensing electrodes 310a and the second sensing electrode 320 may include a plurality of second unit sensing electrodes 320a. In addition, the first unit sensing electrodes 310a may be connected with each other while extending in one direction. Further, the second unit sensing electrodes 320a may be spaced apart from each other.

The first insulating layer 351 may be provided on the first sensing electrode 310 and the second sensing electrode 320. For example, the first insulating layer 351 may entirely or partially surround the first sensing electrode 310 and the second sensing electrode 330. In addition, the first insulating layer 351 may be formed therein with a hole. For example, the first insulating layer 351 may be formed therein with a hole to expose the second unit sensing electrodes 320a spaced apart from each other. Accordingly, the first insulating layer 351 may be provided on the first and second sensing electrodes 310a and 320a to partially expose the second unit sensing electrodes 320a.

The connection electrode 330 may be provided on the first insulating layer 351. For example, the connection electrode 330 may be connected with the second unit sensing electrode 320a on the first insulating layer 351.

When the first insulating layer 351 surrounds the entire portions of the first sensing electrode 310 and the second sensing electrode 320, the connection electrode 350 may be connected with the second unit sensing electrode 320a through the hole formed in the first insulating layer 351. In addition, when the first insulating layer 351 surrounds parts of the first sensing electrode 310 and the second sensing electrode 320, the second unit sensing electrode 320a, which may be exposed, may make contact with the connection electrode 330.

The connection electrode 330 may include a material the same as that of at least one of the first and second sensing electrodes 310 and 320, or similar to that of at least one of the first and second sensing electrodes 310 and 320. Accordingly, the second sensing electrode 320 may be insulated from the first sensing electrode 310 by the connection electrode 330, and may extend in the second direction different from the first direction.

The wire electrode 400 may be provided on the unactive area UA of the substrate 100. For example, the first wire electrode 410 connected with the first sensing electrode 310 and the second wire electrode 420 connected with the second sensing electrode 320 may be provided on the unactive area UA of the substrate 100.

The conductive layer 500 may be provided on the unactive area UA. For example, the conductive layer 500 may be provided on the wire electrode 400 in the unactive area UA. In detail, the conductive layer 500 may be provided on a second insulating layer 352 provided in the unactive area UA.

The first insulating layer 351 and the second insulating layer 352 may include the same material or similar materials. In addition, the first insulating layer 351 and the second insulating layer 352 may be simultaneously formed through the same process.

An insulating material may be provided on the entire surface of the substrate 100, the first insulating layer 351 may be formed on the active area by patterning the insulating material, and the second insulating layer 352 may be formed on the unactive area by patterning the insulating material. The first insulating layer 351 and the second insulating layer 352 may be simultaneously formed through one process.

The connection electrode 330 and the conductive layer 500 may include the same material or similar materials. In addition, the connection electrode 330 and the conductive layer 500 may be simultaneously formed through the same process. A conductive material may be provided on the entire surface of the substrate 100, the connection electrode 330 may be formed on the active area AA by patterning the conductive material, and the conductive layer 500 may be formed on the unactive layer UA by patterning the conductive material. That is, the connection electrode 330 and the conductive layer 500 may be simultaneously formed through one process.

Figure 10:
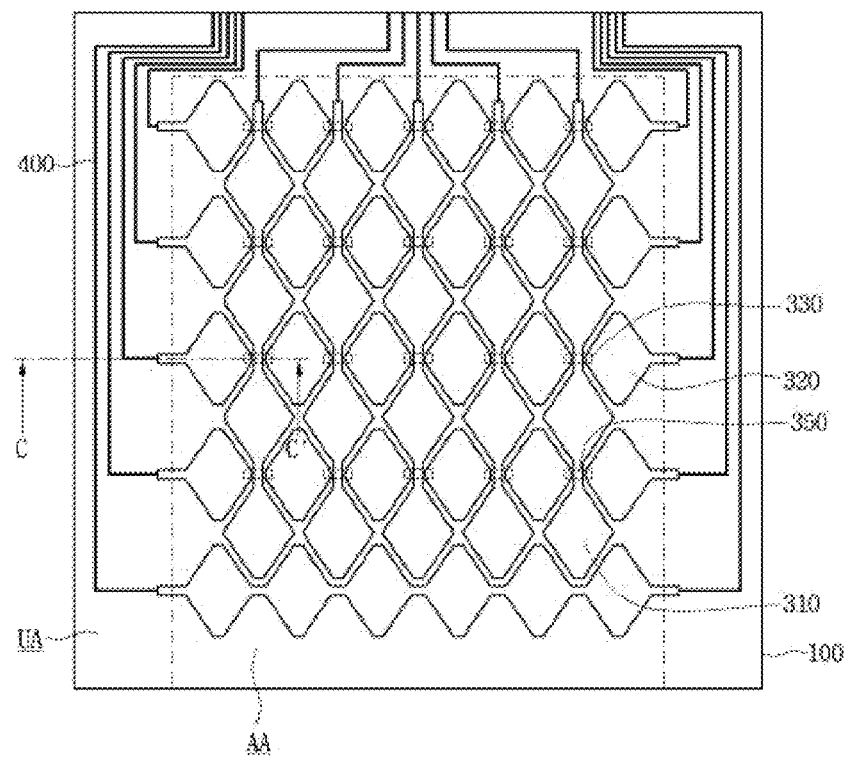
FIG. 10 is another plan view showing the touch window of FIG. 7.
Figure 11:
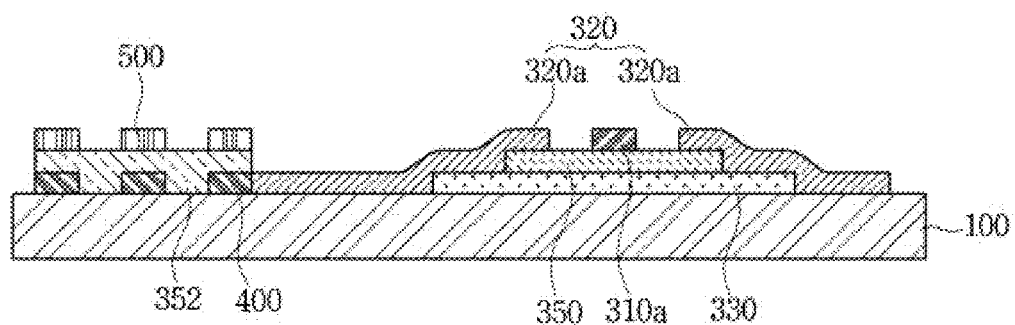
FIG. 11 is a sectional view taken along line C-C' of FIG. 10.

Referring to FIGS. 10 and 11, the connection electrode 330 may be provided on the substrate 100, the first insulating layer 351 may be provided on the connection electrode 330, and the first sensing electrode 310 and the second sensing electrode 320 may be provided on the first insulating layer 351. The first insulating layer 351 may partially expose the connection electrode 330, the first sensing electrode 310 may be provided on the first insulating layer 351, and the second unit sensing electrodes 320 may be provided on the first insulating layer 351 to make contact with the connection electrode 330. Thus, the second sensing electrode 320 may be insulated from the first sensing electrode 310 by the connection electrode 330, and may extend in a direction different from the first direction.

The conductive layer 500 may be provided on an entire surface or a partial surface of the unactive area UA. For example, referring to FIG. 9, the conductive layer 500 may be provided on the entire surface of the second insulating layer 352 corresponding to the unactive area UA. In addition, referring to FIG. 11, the conductive layer 500 may be provided only on an area of the second insulating layer 352 corresponding to an area where the wire electrode is 400 provided.

Figure 12:
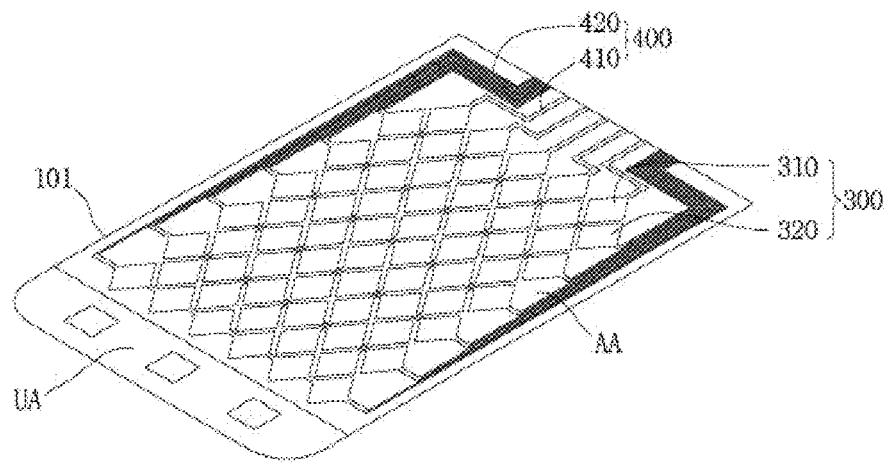
FIG. 12 is a perspective view showing a touch window according to another embodiment.
Figure 13:
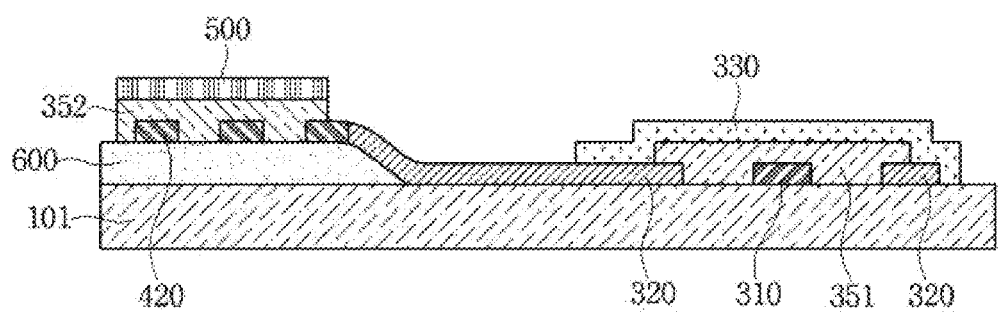
FIG. 13 is a sectional view showing the touch window of FIG. 12.

FIGS. 12 and 13 show a touch window according to another embodiment. In the following description of the touch window, descriptions the same as or similar to that of the touch window according to previous embodiments have been omitted. In addition, same reference numerals may be assigned to same elements as those of the previous embodiments.

Referring to FIGS. 12 and 13, the touch window according to the embodiment may include a cover substrate 101, a sensing electrode 300, a wire electrode 400, and a conductive layer 500. The cover substrate 101 may include an active area AA and an unactive area UA. The cover substrate 101 may include a material the same as or similar to that of the substrate 100.

The sensing electrode 300 and the wire electrode 400 may be provided on the cover substrate 101. For example, the sensing electrode 300 may be provided on the active area AA and the wire electrode 400 may be provided on the unactive area UA.

The sensing electrode 300 may include the first sensing electrode 310 and the second sensing electrode 320. Since the arrangement relationship between the first sensing electrode 310 and the second sensing electrode 320 is the same as or similar to that according to the previous embodiment, details thereof have been omitted.

A decoration layer 600 may be provided on the unactive area UA of the cover substrate 101. The decoration layer 600 may be formed by applying a material having a predetermined color to the unactive area UA so that the wire electrode 400 provided on the unactive area UA and a printed circuit board to connect the wire electrode 400 with an external circuit are not viewed from the outside.

The decoration layer 600 may have a color appropriate to a required outer appearance. For example, the decoration layer 600 may contain black pigments or white pigments to represent a black color or a white color. In addition, the decoration layer 600 may represent various colors, such as, e.g., a red color or a blue color using various color films. When the printing layer is formed of a film, and when the decoration layer 600 is provided on a substrate having a curved surface or a flexible substrate, the decoration layer 600 may be easily provided. In addition, a required logo may be formed on the decoration layer in various manners. The decoration layer may be formed through, for example, deposition, printing, and wet coating. At least one decoration layer may be provided. For example, one decoration layer may be provided or at least two decoration layers having mutually different widths may be provided.

The wire electrode 400 may be provided on the unactive area UA. For example, the wire electrode 400 may be provided on the decoration layer 600 of the unactive area UA. The wire electrode 400 may include the first wire electrode 410 connected with the first sensing electrode 310 and the second wire electrode 420 connected with the second sensing electrode 320.

The conductive layer 500 may be provided on the unactive area UA. For example, the conductive layer 500 may be provided on the wire electrode 400 of the unactive active area UA. In detail, the conductive layer 500 may be provided on the second insulating layer 352 provided on the unactive layer US. The arrangement relationship of the conductive layer 500 is the same as or similar to that according to the previous embodiment described above except that the wire electrode 400 is provided on the decoration layer 600.

According and similarly to the touch windows of the previous embodiments and this embodiment, the movement of the noise generated from the wire electrode 400 may be blocked by the conductive layer 500. Accordingly, touch efficiency and reliability of the touch window may be improved. In addition, the conductive layer, that is, the shield layer, may not be separately formed but formed together with the connection electrode when the connection electrode is formed, so that process efficiency may be improved. When the shield layer is formed, since an additional support member is not required to support the shield layer, the increase of the thickness resulting from the additional support member may be prevented.

Figure 14:
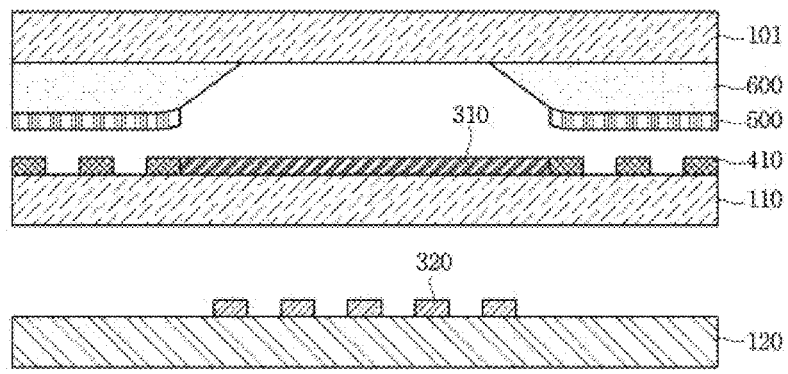
FIG. 14 is a sectional view showing a touch window according to still another embodiment.
Figure 15:
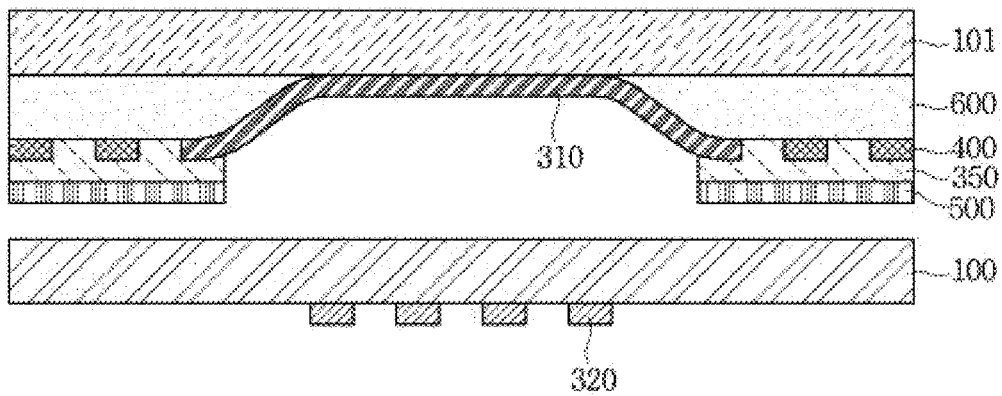
FIG. 15 is a sectional view showing a touch window according to still another embodiment.
Figure 16:
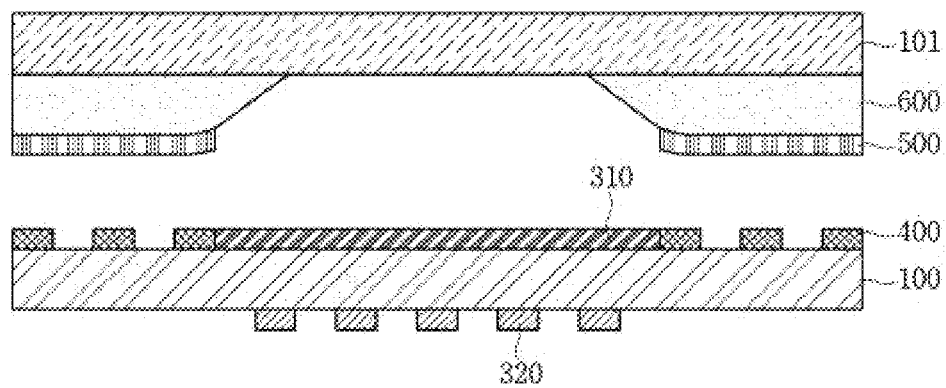
FIG. 16 is a sectional view showing a touch window according to still another embodiment.

FIGS. 14 to 16 show a touch window according to other embodiments. In the following descriptions of the touch window, descriptions the same as or similar to that of the touch window according to previous embodiments have been omitted. In addition, same reference numerals may be assigned to same elements as those of the previous embodiments.

Referring to FIG. 14, the touch window may include a cover substrate 101, a first substrate 110, a second substrate 120, a sensing electrode 300, a wire electrode 400, and a conductive layer. The cover substrate 101 may be provided on the first substrate 110. The cover substrate 101 may be combined with the first substrate 110. For example, the cover substrate 101 and the first substrate 110 may be bonded to each other through a transparent adhesive layer.

The first substrate 110 may be provided on the second substrate 120. The first substrate 110 may be bonded to the second substrate 120. That is, a first surface of the first substrate 110 may be bonded to the cover substrate 101, and a second surface opposite to the first surface of the first substrate 110 may be bonded to the second substrate 120.

The sensing electrode 300 may include the first sensing electrode 310 and the second sensing electrode 320. The first sensing electrode 310 and the second sensing electrode 320 may extend in mutually different directions.

The first sensing electrode 310 may be provided on the first substrate 110. For example, the first sensing electrode 310 may extend in a first direction on the first substrate 110. In addition, the second sensing electrode 320 may be provided on the second substrate 120. For example, the second sensing electrode 320 may extend in a second direction different from the first direction on the second substrate 120. Each of the first sensing electrode 310 and the second sensing electrode 320 may be connected with the wire electrode 400.

The decoration layer 600 may be provided on the unactive area of the cover substrate 101. The conductive layer 500 may be provided on an entire surface or a partial surface of the decoration layer 600. The conductive layer 500 may include a material the same as or similar to a material constituting at least one of the first sensing electrode 310 and the second sensing electrode 320.

Although drawings show that the conductive layer 500 is provided on the decoration layer, the embodiment is not limited thereto. That is, the conductive layer 500 may be provided on the wire electrode 400. For example, an additional insulating layer may be provided on the wire electrode 400, and the conductive layer 500 may be provided on the insulating layer 350.

Referring to FIG. 15, the touch window may include a cover substrate 101, a substrate 100, a sensing electrode 300, a wire electrode 400, and a conductive layer. The cover substrate 101 may be bonded to the substrate 100. For example, the cover substrate 101 and the substrate 100 may be bonded to each other through a transparent adhesive layer.

The sensing electrode 300 may include the first sensing electrode 310 and the second sensing electrode 320. The first sensing electrode 310 and the second sensing electrode 320 may extend in mutually different directions.

The first sensing electrode 310 may be provided on the cover substrate 101. For example the first sensing electrode 310 may extend in a first direction on the cover substrate 101. In addition, the second sensing electrode 320 may be provided on the substrate 100. For example, the second sensing electrode 320 may extend in a second direction different from the first direction on the substrate 100. Each of the first sensing electrode 310 and the second sensing electrode 320 may be connected with the wire electrode 400.

The decoration layer 600 may be provided on the unactive area UA of the cover substrate 101. In addition, referring to FIG. 17, the conductive layer 500 may be provided on an entire surface or a partial surface of the decoration layer 600.

The wire electrode 400 may be provided on the decoration layer 600, the insulating layer 350 may be provided on the wire electrode 400, and the conductive layer 350 may be provided on the insulating layer 350.

The conductive layer 500 may include a material the same as or similar to that of at least one of the first sensing electrode 310 and the second sensing electrode 320.

Referring to FIG. 16, the touch window may include a cover substrate 101, a substrate 100, a sensing electrode 300, a wire electrode 400, and a conductive layer. The cover substrate 101 may be provided on the substrate 100. The cover substrate 101 may be bonded to the substrate 100.

The sensing electrode 300 may include the first sensing electrode 310 and the second sensing electrode 320. The first sensing electrode 310 and the second sensing electrode 320 may extend in mutually different directions.

The first sensing electrode 310 may be provided on a first surface of the substrate 100. For example, the first sensing electrode 310 may extend in a first direction on the first surface of the substrate 100. In addition, the second sensing electrode 320 may be provided on a second surface opposite to the first surface of the substrate 100. For example, the second sensing electrode 320 may extend in a second direction different from the first direction on the second surface of the substrate 100. Each of the first sensing electrode 310 and the second sensing electrode 320 may be connected with the wire electrode.

The decoration layer 600 may be provided on the unactive area of the cover substrate 101. In addition, the conductive layer 500 may be provided on the entire surface or the partial surface of the decoration layer 600.

The conductive layer 500 may include a material the same as or similar to that of at least one of the first sensing electrode 310 and the second sensing electrode 320.

Although drawings show that the conductive layer 500 is provided on the decoration layer, the embodiment is not limited thereto, and the conductive layer 500 may be provided on the wire electrode 400. For example, an additional insulating layer may be provided on the wire electrode 400, and the conductive layer 500 may be provided on the insulating layer 350.

Figure 17:
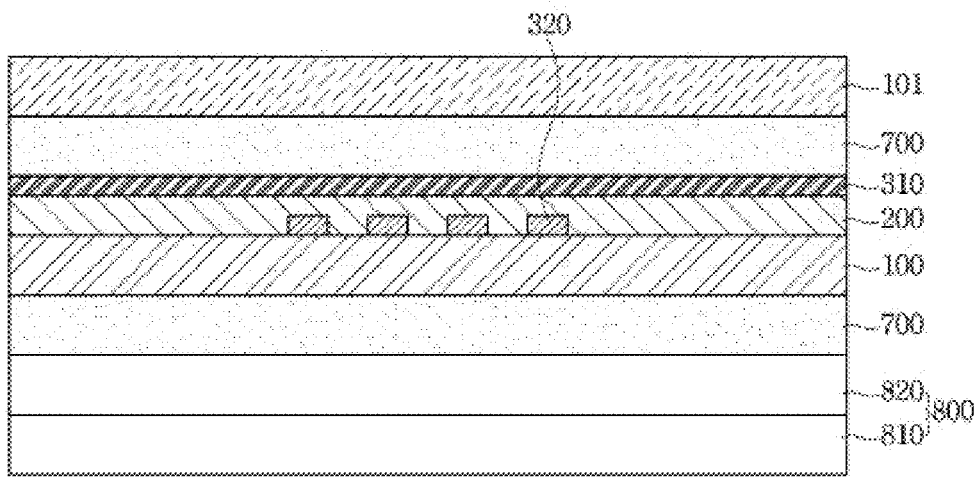
FIG. 17 is a sectional view showing a touch device fabricated by coupling the touch window according to embodiments with a display panel.

FIG. 17 shows a touch device fabricated by coupling the touch window according to embodiments disclosed herein with a display panel. Referring to FIG. 17, the touch device according to an embodiment may include a touch window disposed or provided on a display panel 800.

The touch device may be fabricated by coupling the substrate 100 with the display panel 800. The substrate 100 may be bonded to the display panel 800 through the adhesive layer 700. For example, the substrate 100 and the display panel 800 may be bonded to each other through the adhesive layer 700 including an OCA.

The display panel 800 may include a first prime substrate 810 and a second prime substrate 820. When the display panel 800 is a liquid crystal display panel, the display panel 800 may have a structure in which the first prime substrate 810 including a thin film transistor (TFT) and a pixel electrode is combined with the second prime substrate 820 including color filter layers while a liquid crystal layer is interposed between the first prime substrate 810 and the second prime substrate 820.

Further, the display panel 800 may be a liquid crystal display panel having a color filter on transistor (COT) structure formed by combining the first prime substrate 810 formed thereon with the TFT, a color filter, and a black matrix with the second prime substrate 820 while the liquid crystal layer is interposed or provided between the first prime substrate 810 and the second prime substrate 820. That is, the TFT may be formed on the first prime substrate 810, a protective layer may be formed on the TFT, and the color filter layer may be formed on the protective layer. In addition, the pixel electrode, which may contact with the TFT, may be formed on the first prime substrate 810. In this case, to improve an aperture ratio and simplify a mask process, the black matrix may be omitted, and a common electrode may perform a function of the black matrix together with an inherent function thereof.

In addition, when the display panel 800 is a liquid crystal panel, the display device may further include a backlight unit for providing light at the back of the display panel 800.

When the display panel 800 is an organic light emitting device, the display panel 800 may include a self light-emitting device which may not require any additional light source. A thin film transistor may be formed on the first substrate 810 of the display panel 800, and an organic light-emitting device (OLED) making contact with the thin film transistor may be formed. The OLED may include an anode, a cathode, and an organic light-emitting layer formed between the anode and the cathode. The display panel 800 may further include the second prime substrate 820, which may perform the function of an encapsulation substrate for encapsulation, on the OLED.

Figure 18:
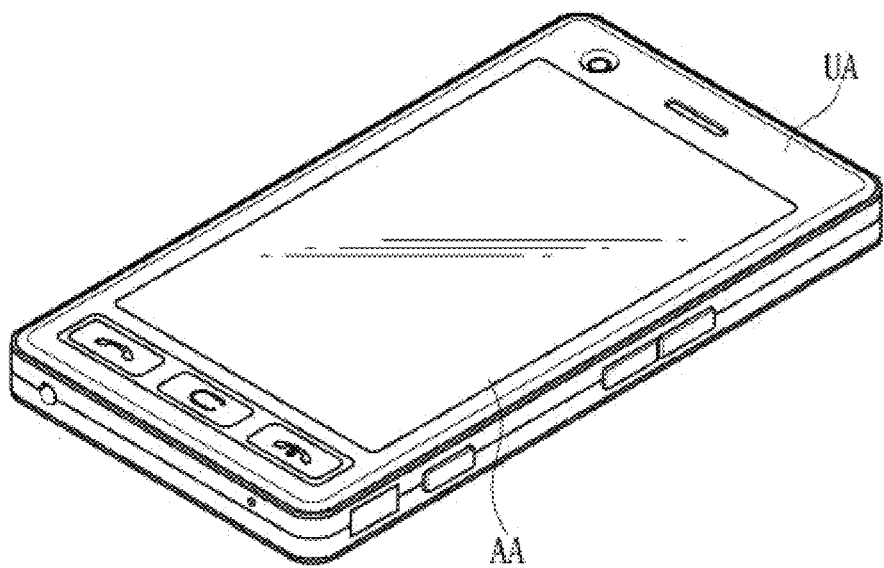
FIGS. 18 to 21 are views illustrating a touch device employing the touch window according to embodiments.

FIGS. 18 to 21 show a touch device employing the touch window according to embodiments disclosed herein. Referring to FIG. 18, a mobile terminal is illustrated as an example of the touch device. The mobile terminal may include the active area AA and the unactive area UA. The active area AA may be an area in which a touch signal is sensed due to a touch by a finger, and an instruction icon pattern part and a logo may be formed in the unactive area UA.

Figure 19:
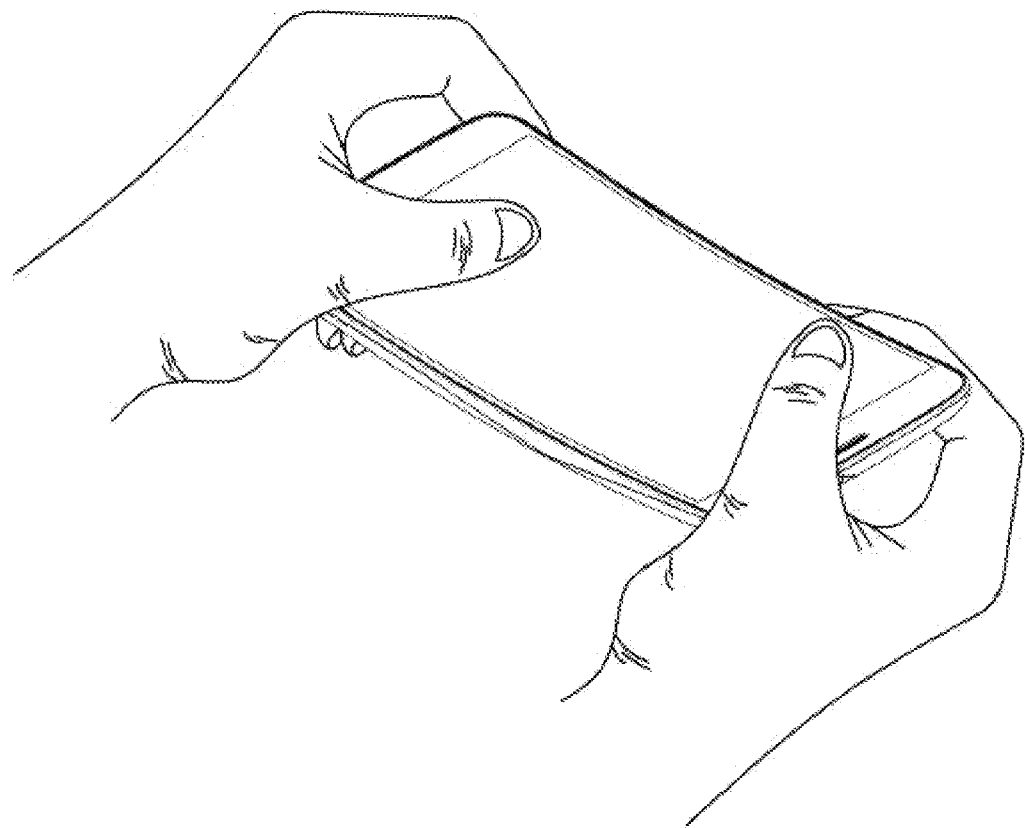

Referring to FIG. 19, the touch window may include a flexible touch window. Thus, the touch device including the touch window may be a flexible touch device which may be bent or flex by a hand of a user.

Figure 20:
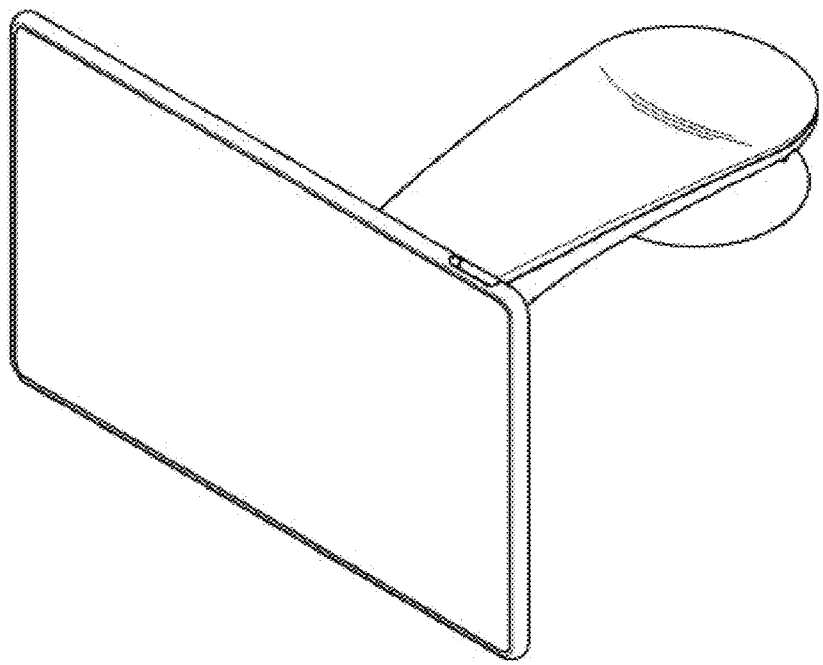

Referring to FIG. 20, the touch window may be applied to a vehicle navigation system as well as the touch device, for example, the mobile terminal.

Figure 21:
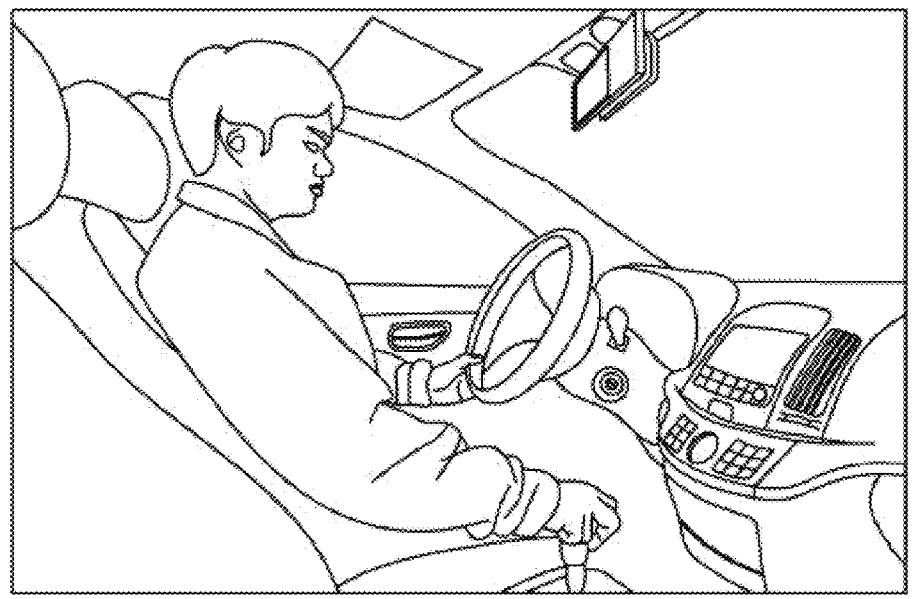

Referring to FIG. 21, the touch panel may be applied inside a vehicle. That is, the touch panel may be applied to various parts or portions in the vehicle where the touch panel is applied. Accordingly, the touch panel is applied to a dashboard as well as a PND (Personal Navigation Display), thereby realizing a CID (Center Information Display). However, the embodiment is not limited thereto. The touch device may be used in various electronic products.

Embodiments disclosed herein provide a touch window having improved touch efficiency and improved reliability.

According to the embodiments disclosed herein, there is provided a touch window including a substrate including an active area and an unactive area, a first sensing electrode on the active area, a wire electrode on the unactive area, an intermediate layer on the substrate, a second sensing electrode on the intermediate layer, and a conductive layer on the wire electrode. The conductive layer may include a material corresponding to a material constituting at least one of the first and second sensing electrodes.

The touch window according to the embodiments may include a conductive layer provided on the wire electrode, and include a material corresponding to that of the sensing electrode. Accordingly, the conductive layer serving as a shield layer may be provided on the wire electrode to block movement of noise. Accordingly, touch efficiency of the touch window may be improved and reliability of the touch window may be improved.

In addition, the conductive layer may be formed together with the sensing electrode through the same process. In other words, the sensing electrode and the conductive layer may be simultaneously formed through one process.

Accordingly, the conductive layer, that is, the shield layer to block noise generated from the wire electrode, may not be separately formed, but formed together with the sensing electrode when the sensing electrode is formed. Accordingly, process efficiency may be improved. In addition, when the shield layer is formed, since an additional support member is not required to support the shield layer, thickness increase may be prevented.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

When a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a substrate including an active area and an unactive area;
a first sensing electrode on the active area of the substrate;
a wire electrode on the unactive area;
an intermediate layer on the substrate;
a second sensing electrode on the intermediate layer; and
a conductive layer on the wire electrode,
wherein the wire includes a first wire connected with the first sensing electrode; and a second wire connected with the second sensing electrode,
wherein the first wire and the second wire are disposed on the same plane of the unactive area of the substrate,
wherein a thickness of the intermediate layer is 0.01 times to 0.1 times the thickness of the substrate,
wherein a sectional area of the intermediate layer is smaller than that of the substrate,
wherein the intermediate layer is provided on the active area and the unactive area,
wherein an exposure area is formed in the intermediate layer, and one surface of the unactive area of the substrate is exposed through the exposure area,
wherein the second sensing electrode and the second wire is connected through the exposure area, wherein the intermediate layer includes a dielectric material,
wherein at least one of the first sensing electrode, the second sensing electrode, and the wire electrode has a mesh shape including mesh lines,
wherein a line width of the mesh lines is in the range of 0.1 μm to 10 μm,
wherein a thickness of the mesh line is in the range of 100 nm to 500 nm,
wherein the conductive layer includes a material that corresponds to a material constituting the second sensing electrode.

2. The touch window of claim 1, wherein the conductive layer is provided on an area of the intermediate layer that corresponds to an area in which the wire electrode is provided.

3. The touch window of claim 1, wherein the conductive layer is provided on an entire surface of the unactive area on an insulating layer.

4. The touch window of claim 1, wherein the intermediate layer has visible ray transmittance of 79% to 99%.

5. The touch window of claim 1, the substrate is bent with a partial flat surface and a partial curved surface.

* * * * *